(12) United States Patent
Stark et al.

(10) Patent No.: US 8,192,613 B2
(45) Date of Patent: Jun. 5, 2012

(54) METHOD FOR REDUCING FOULING IN FURNACES

(75) Inventors: Joseph L. Stark, Richmond, TX (US); Lorenzo Spagnuolo, Ariano Irpino (IT); Roger D. Metzler, Sugar Land, TX (US); Thomas J. Falkler, Missouri City, TX (US)

(73) Assignee: Baker Hughes Incorporated, Houston, TX (US)

( * ) Notice: Subject to any disclaimer, the term of this patent is extended or adjusted under 35 U.S.C. 154(b) by 609 days.

(21) Appl. No.: 12/372,865

(22) Filed: Feb. 18, 2009

(65) Prior Publication Data

US 2009/0211947 A1    Aug. 27, 2009

Related U.S. Application Data

(60) Provisional application No. 61/031,237, filed on Feb. 25, 2008.

(51) Int. Cl.
*C10G 75/04*    (2006.01)

(52) U.S. Cl. .................. 208/48 AA; 208/47; 208/48 R; 208/48 Q

(58) Field of Classification Search ................ 208/48 Q, 208/48 AA
See application file for complete search history.

(56) References Cited

U.S. PATENT DOCUMENTS

| | | | |
|---|---|---|---|
| 4,163,728 A | 8/1979 | Cheng et al. | |
| 4,575,413 A | 3/1986 | Pizzoni et al. | |
| 4,686,201 A | 8/1987 | Porter et al. | |
| 4,842,716 A * | 6/1989 | Kaplan et al. | 208/48 AA |
| 5,427,690 A * | 6/1995 | Rowe et al. | 208/48 AA |
| 6,368,494 B1 * | 4/2002 | Tong | 208/48 AA |
| 2003/0234171 A1 | 12/2003 | Owen et al. | |
| 2005/0199530 A1 * | 9/2005 | Stark et al. | 208/131 |

FOREIGN PATENT DOCUMENTS

EP    0391620 A1    10/1990

OTHER PUBLICATIONS

Borsa et al.; Materials and Interfaces, "Characterization of Coke Formed in Vinyl Chloride Manufacture," Ind. Eng. Chem. Res., vol. 38, 1999, pp. 4259-4267.

Borsa et al., "Coke and Byproduct Formation during 1,2-Dichloroethane Pyrolysis in a Laboratory Tubular Reactor," Ind. Eng. Chem. Res., vol. 40, 2001, pp. 2428-2436.

* cited by examiner

*Primary Examiner* — Prem C Singh
*Assistant Examiner* — Michelle Stein
(74) *Attorney, Agent, or Firm* — Mossman, Kumar & Tyler PC

(57) ABSTRACT

Heat exchanger fouling in organic chemical production processes may be reduced using an antifoulant additive. The antifoulant additive may have one component selected from the group consisting of an alkylphosphate ester, and an alpha olefin maleic anhydride copolymer; or it may have two components selected from the group consisting of a metallic overbase, an alkylphosphate ester, and an alpha olefin maleic anhydride copolymer, wherein at least one of the two components in not an overbase. An additive having three components: a metallic overbase, an alkylphosphate ester, and an alpha olefin maleic anhydride copolymer; is also within the scope of the disclosure.

11 Claims, No Drawings

METHOD FOR REDUCING FOULING IN FURNACES

CROSS REFERENCE TO RELATED APPLICATIONS

This application claims priority from the U.S. Provisional Patent Application having the Ser. No. 61/031,237; which was filed on Feb. 25, 2008; and which is fully incorporated herein by reference.

BACKGROUND OF THE INVENTION

1. Field of the Invention

The invention relates to additives useful for reducing fouling in furnaces. The invention particularly relates to additives useful for reducing fouling in furnaces used for producing organic chemicals.

2. Background of the Art

Chemical plants producing organic chemicals often use furnaces to heat process streams. Whether heated with steam or heat transfer fluids, or directly using burners, such furnaces function by heating tubes through which process fluids are passing. The furnaces include a number of such tubes, generally arranged vertically, that form a continuous flow path, or coil, through the furnace. These tubes are generally in a unit referred to in the art as a heat exchanger.

The tubes in a heat exchanger may be exposed to extreme heat. As the process fluids are passed through the tubes at high temperatures, the process fluids may be subject to a synthetic reaction, a reduction in undesirable products, a steric rearrangement, a decomposition, or the like, such that the resulting product exiting the outlet is either a finished product or an intermediate, depending upon the particular process. In either case, the one element that the process streams have in common is that the passing of a feed material through a flow path that is subject to heat from a burner or other heat source can result in the fouling of the surfaces of the tubes and/or production of undesirable materials within the process streams.

The deposit of any insulating material on the heat exchanging surfaces of the flow path can be undesirable in that it can result in increased energy costs as temperatures are increased to overcome the effect of the insulating deposits and increase operational costs when the furnaces are shut down for periodic cleaning of the heat exchanging surfaces. It would therefore be desirable in the art of manufacturing products using processes which include subjecting organic process streams to heat to avoid or mitigate the formation of fouling deposits on heat exchanging surfaces.

SUMMARY OF THE INVENTION

In one aspect, the invention is a process for reducing heat exchanger fouling in an organic chemical production process comprising adding to an organic chemical production process stream an antifoulant additive wherein the antifoulant additive has at least two components selected from the group consisting of a metallic overbase, an alkylphosphate ester, and an alpha olefin maleic anhydride copolymer, wherein at least one of the two components in not an overbase.

In another aspect, the invention is a process for reducing heat exchanger fouling in an organic chemical production process comprising adding to an organic chemical production process stream an antifoulant additive wherein the antifoulant additive has at least one components selected from the group consisting of an alkylphosphate ester, and an alpha olefin maleic anhydride copolymer.

In still another aspect, the invention is an antifoulant additive comprising: one component selected from the group consisting of an alkylphosphate ester, and an alpha olefin maleic anhydride copolymer;
two components selected from the group consisting of a metallic overbase, an alkylphosphate ester, and an alpha olefin maleic anhydride copolymer, wherein at least one of the two components in not an overbase; or
three components, (i) a metallic overbase, (ii) an alkylphosphate ester, and (iii) an alpha olefin maleic anhydride copolymer.

DESCRIPTION OF THE PREFERRED EMBODIMENTS

In one embodiment, the invention is an antifoulant additive comprising a metallic overbase. The term metallic, for the purposes of this disclosure, means having one or more of: beryllium, magnesium, calcium, strontium, barium, radon, scandium, yttrium, lanthanide, actinide, boron, aluminium, gallium, indium, and thallium. Thus, the overbases useful with the invention may include one or more of these, such as for example, a magnesium overbase which has magnesium being the only metal present at material concentrations. Embodiments of the invention include, for example, additives having a magnesium overbase component or an aluminium overbase or a mixed magnesium aluminium overbase. Other embodiments may have, for example, a calcium overbase component or a barium overbase.

In one embodiment, the metallic overbase useful with method of the invention is a magnesium overbase and/or a magnesium aluminum overbase. The terms "overbase" and "overbases" refers to compounds with a great capacity of neutralizing acids. The term(s) aluminum and magnesium overbases mean that the subject metallic overbases contain atoms of these metals. The metallic overbase component of the antifoulant additives used with the invention may be prepared in any manner known to those of ordinary skill in the art for preparing such overbases to be useful.

In one embodiment, the metallic overbase is a magnesium oxide/magnesium carboxylated overbase complex. This overbase is desirably in the form of finely divided, preferably submicron (no dimension greater than 1 micron), particles which can form a stable dispersion in oil. One method of preparing such a magnesium oxide/magnesium carboxylated-overbase complex is to form a mixture of a base of the desired metal; e.g., $Mg(OH)_2$, a complexing agent; e.g., a fatty acid such as a tall oil fatty acid, which is present in a quantity much less than that required to stoichiometrically react with the hydroxide, and a non-volatile diluent. The mixture is heated to a temperature of about 250 to 350° C. to produce the overbase complex of the metal oxide and metal salt of the fatty acid.

Such process are known in the prior art. For example, the process of U.S. Pat. No. 4,163,728, which is fully incorporated herein by reference, may be used. Therein, it is disclosed that the a magnesium carboxylate can be prepared using a process employing minor percentages of stoichiometric amounts of carboxylic acid such as less than about 50% of the calculated stoichiometric amount. In this process, any suitable carboxylic acid at low stoichiometry can be employed. These include mono- and polycarboxylic acids including aliphatic, aromatic, and cycloaliphatic, carboxylic acids. Representative examples include: formic acid, acetic acid, propionic acid, butyric acid, acrylic acid, maleic acid, and the like.

Any suitable magnesium carboxylate capable of being subdivided upon decomposition into submicron particles of magnesia can be employed in the magnesium carboxylate-magnesium hydroxide mixture. Magnesium acetate is a preferred starting magnesium carboxylate compound in such mixture whether starting as the anhydrous solid, hydrated solid or aqueous slurry, or as magnesium carboxylate formed in situ. The magnesium overbases acceptable for the method of this invention may also include overbase compounds where a carbonation procedure has been done. Typically, the carbonation involves the addition of $CO_2$, as is well known in the art.

Any suitable non-volatile process fluid capable of being heated to the decomposition temperature of the magnesium carboxylate-magnesium hydroxide mixture can be employed. The process fluid should be relatively stable and relatively non-volatile at the decomposition temperature. However, any volatility encountered is readily controlled by refluxing and condensing apparatus. Examples of such non-volatile process fluids are as follows: hydrocarbons (such as mineral oil, paraffin oil, or aromatic oil), diphenyl oxide fluids, silicone oils, polyglycol ethers or vegetable oils, etc., solely the dispersant, or any combinations thereof.

In some embodiments, the non-volatile process fluid may contain at least one dispersant capable of retaining the magnesium compound formed by decomposition in stable suspension. Any suitable dispersant which is relatively stable under the decomposition conditions of this invention can be employed. Exemplary dispersants include saturated and unsaturated fatty acids (such as stearic acid and oleic acid) and derivatives thereof (such as sorbitan mono-oleate), sulfonic acids (such as mahogany or petroleum derived sulfonic acids and synthetic sulfonic acids), naphthenic acids, oxyalkylated fatty amines, alkylphenols, sulfurized alkylphenols, oxyalkylated alkylphenols, and the like.

Similarly, the aluminum overbases useful with the invention may be made using any method known to those of ordinary skill in the art of preparing such compounds to be useful. For example, in one process to make an aluminum overbase, dodecylbenzene sulfonic acid is admixed with kerosene and isobutanol to form a first solution. The first solution is then acidified with a nitric acid and then admixed with alumina. This solution is then subject to distillation to remove water and solvent resulting in an aluminum sulfonic acid overbase.

The other metals useful in preparing the metallic overbases useful with the invention may used to form overbases in a similar fashion. The metallic overbases useful with the invention may also be prepared using other synthetic routes. Whether made by the same method with substitution of the appropriate cation, such as Ca for Mg, or made via a different route, the overbases may be used with embodiments of the invention.

In one desirable embodiment of the invention, the antifoulant additives include a magnesium overbase and an aluminum overbase. When the antifoulant additive includes such a magnesium aluminum overbase, the two components may be present in the additive at a weight concentration of each metal [Mg:Al] of from about 1:99 to about 99:1. In one embodiment, the ratio of Mg:Al is from 90:10 to 10:90. In still another embodiment, the ratio of Mg:Al is from about 80:20 to about 20:80. In yet another embodiment the ratio of Mg:Al is from about 70:30 to about 30:70, or about 60:40 to about 40:60. These ratios may also be used with other metal combinations, such as Mg:B and/or Al:Y In some embodiments of the invention, the antifoulant additive includes an alkylphosphate ester. The term alkylphosphate ester includes alkyl thiophosphate esters. The phosphate ester is, in some embodiments, an alkyl phosphate ester, where the alkyl group of the phosphate ester includes from about 1 to about twenty carbon atoms. In some embodiments, the alkyl group is highly branched. Exemplary phosphate esters include isododecyl phosphate esters, isooctyl phosphate esters, and the like. Another group of alkylphosphate esters useful with the invention include those having a thiophosphate group. Exemplary alkyl thiophosphate esters include(ethyl)hexyl thiophosphate ester and di(ethyl)hexyl thiophosphate ester, octyl thiophosphate ester, butyl thiophosphate ester, nonyl thiophosphate ester, t-butyl thiophosphate ester, and the like.

In other embodiments of the invention, the antifoulant additive may include a maleic anhydride alpha olefin copolymer. Such copolymers which may be useful with invention include those having the general formula:

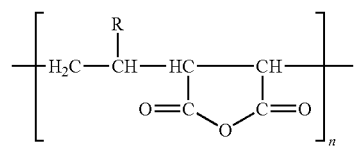

wherein R is a hydrocarbon substituent having from about 6 to about 30 carbons. In some embodiments, R has from about 10 to 26 carbons, while in other embodiments R has from about 12 to 24 carbons. In still other embodiments, R has from about 12 to 14 carbons. The copolymer may have a molecular weight (Mw) of from about 2,000 to about 12,000 Daltons.

The antifoulant additives useful with the method of the invention may include one component selected from an alkylphosphate ester, and an alpha olefin maleic anhydride copolymer. In another embodiment, the antifoulant additives may include at least two components selected from the group consisting of a metallic overbase, an alkylphosphate ester, and an alpha olefin maleic anhydride copolymer. In some embodiments, the antifoulant additives will include three components with one of the components being an overbase. The overbase may be, for example, a magnesium overbase or a magnesium aluminum overbase. At least one of the components will not be an overbase.

The total feed rate of the antifoulant additive will generally be determined by the operator of the specific process unit to be subject to treatment using the additive. Those of ordinary skill in the art in operating such a unit will know how to make such determinations based upon the specific operating parameters of their production units. Never the less, in some embodiments, the feed range of the antifoulant additives will be from about 10 to 10,000 ppm by weight of antifoulant additive in the process stream being treated. In other embodiments, the feed range will be from about 100 to 1,000 ppm. In still other embodiments, the feed range will be from about 200 to about 800 ppm.

While not wishing to be bound by any theory, it is believed that each of the components of the antifoulant additives may play a synergistic part when utilized in a production process. For example, the alkylphosphate esters are believed to be effective at passivation. Passivation is the process of making a material "passive" in relation to another material prior to using the materials together. In this instance, it is believed that by passivating the metal in an exchanger tube, there is a reduction in the formation of fouling caused by a catalytic effect of the metal.

In a similar fashion, the overbase materials are believed to act as a thermal stabilizer thereby keeping asphalt or coke like materials from forming. In contrast, it is believed that the maleic anhydride alpha olefin copolymers are effective dispersants that prevent the precipitation of extant asphalt or coke like materials onto the tubes of a heat exchanger. These components, when combined function synergistically to mitigate or, in some applications, materially prevent heat exchange fouling.

Since each of these components function in a slightly different way, the antifoulant additives can be prepared with more of any given component to address a special problem with a specific production unit. In the alternative, the ratio of the components may be varied as process conditions change with product changes or changes in production rates, or the like.

Since only two components are necessary in some embodiments of the antifoulant additive, the lower concentration of each component is "0" subject to the restrictions and limitations already discussed. For example, in a two component formulation, where a first component is a magnesium overbase (MO) and the second component is a maleic anhydride alpha olefin copolymer (CP), the ratio of CP:MO may be, for example, from 1:2 to 3:1. The individual ratios of each component to other components will generally be determined based upon the specific fouling problems in the production unit to be treated.

The antifoulant additives of the invention may be used in processes wherein process feed steams, generally hydrocarbons or halohydrocarbons and the like, are contacted with extreme heat to reduce or mitigate fouling. For example, the additives of the invention are particularly useful in furnace feed streams where coke or asphalt formation is a principal cause of fouling.

The antifoulant additive of the invention may be used with any production process which incorporates a furnace. For example, the method of the invention may be used with vacuum distillation tower furnaces. The process of the invention may be used in any circumstance where a process feed stream is being fed through a furnace at temperatures that would induce fouling of the heat exchanging surfaces of the furnace. For the purposes of the invention, these temperatures are those from about 60° C. to about 870° C. Further, also for the purposes of the invention, the term "furnace feed stream" means not just feeds going into a furnace, but rather any circumstances wherein a hydrocarbon is brought into contact with a surface, especially the surface of a heat exchanger, at a temperature of from 60° C. to about 870° C. Also, for the purposes of this application, the term heat exchange includes any metal surface that is both within the temperature range for fouling and is in contact with a process stream that may produce fouling.

The antifoulant additives of the invention may be introduced into their target feed material in any way known to be useful to those of ordinary skill in the art subject to the caveat that the antifoulant additives are introduced prior to or concurrent with the feed contacting the surfaces which are to be protected from fouling. For example, in one application of the invention, the antifoulant additive is injected into the feed material upstream from a furnace as they pass through a turbulent section of a chemical production process. In another application, the antifoulant additive is admixed with the feed in holding vessel that is agitated. In still another application, the antifoulant additive is admixed with the feed immediately upstream of a furnace by injecting it into a turbulent flow, the turbulent flow being created by static mixers put into place for the purpose of admixing the antifoulant additive with a feed material. In still another embodiment, the antifoulant additive is atomized and fed into a vaporous feed stream using, for example, an injection quill.

The components of the antifoulant additives may be premixed and then fed into a targeted process, but in many embodiments, the components are admixed immediately before introduction. For example, in one embodiment of the invention, a three component system is shipped to a customer in three separate containers and then introduced into a process stream using a separate pump for each container, the effluent from each pump being combined and then sent through a static mixer prior to entering the process stream.

While the antifoulant additives of the invention may be used with many different processes, the may be particularly useful for processes that include halohydrocarbon feed streams. Exemplary processes include but are not limited to the production of ethylene dichloride, vinyl chloride monomer, polyvinyl chloride, and the like.

While not wishing to be bound by any theory, it is believed that the antifouling additives of the invention mitigate or prevent fouling by stopping the formation of asphalt or coke like materials in solution, and/or stopping the formation of asphalt or coke like materials at the metal surface of an exchange and/or prevent the precipitation of asphalt or coke like materials that would otherwise form a fouling layer upon a heat exchange surface thereby lessening the amount of such species fouling the hot surfaces of the furnace.

EXAMPLES

The following examples and hypothetical example are provided to illustrate the invention. The examples are not intended to limit the scope of the invention and they should not be so interpreted. Amounts are in weight parts or weight percentages unless otherwise indicated.

Hypothetical Comparative Example I (Control)

A vinyl chloride production facility includes a pyrolysis unit which converts 1,2 dichloroethane into vinyl chloride and hydrochloric acid. This unit has 4 heat exchangers which are used in parallel. Under normal operating conditions, the heat exchangers are pulled for cleaning when the feed pressure to the exchange exceeds 120 psig or the conversion rate through the exchanger drops by 5 percent from that of an unfouled exchanger. The average time between cleaning for the 4 heat exchangers is 42 days.

Hypothetical Example II

An antifoulant additive of the invention having two components, where a first component is a magnesium overbase (MO) and the second component is a maleic anhydride alpha olefin copolymer (CP), is used to treat the pyrolysis unit described in the hypothetical comparative example. The ratio of CP:MO 1:2 and the antifoulant additive is fed at a rate of 800 ppm by with into the feed stream using two drums each having its own pump, the effluent from the pump going through a static mixer, and the antifoulant additive being fed into the process stream just prior to process stream entering the furnace. The average time between cleanings for the 4 heat exchangers is 66 days.

Example 1

Several 50 ml samples of EDC feed is added to preweighed 150 mL Ace Glass slit vented covered reactor liners. Additives were included into each sample as shown below in the Table. Each compound was added as the specified number of microliters of a solution having a concentration of each agent also shown in the table. The reactor liner is placed into a reactor. An overhead (clean) reaction vessel/transfer line is tared and secured to the test reactor.

The furnace is heated to a range of from about 890° F. to 950° F. (476° C. to 510° C.). The reactor is then placed into the heated furnace. An automated computer based test program records the test elapsed time, sample temperature and autoclave pressure every 30 seconds throughout the test run. The test apparatus is fitted with a 0-1000 psi (0-6.9 MPa) pressure transducer and thermocouples to record test fluid, reactor heater, and reactor chamber/transfer line temperatures. Elapsed time is recorded and at a preset time the reactor vessel is removed from the heated furnace, and the exothermic rapid pressure increase is recorded. The hot EDC vapors are sent to an overhead reaction vessel/transfer line where coke formation occurs. This process usually is completed in ten to twelve minutes after the EDC test sample has reached the set test temperature, i.e., 930F (499° C.). The test is completed as the pressure curve reaches a break point. The test apparatus is allowed to cool and the disassembled. The reaction vessel/transfer line is removed and weighed for weight gain (coke formed in the line). This coke is then physically removed and the weight recorded. The weight of coke formed in the reaction vessel/transfer is compared for treated and untreated EDC tests. Test Results are located below in the table.

TABLE

| Sample ID | Compound A | Compound B | Compound C | % Reduction |
|---|---|---|---|---|
| 1-A | — | — | — | 0 |
| 1-B | 100 | — | — | 26.6 |
| 1-C | — | 100 | — | 38.6 |
| 1-D | — | — | 100 | 32.3 |
| 1-E | 33 | 33 | 33 | 64.8 |

Compound A is a Magnesium Overbase [64.3%]
Compound B is a Maleic Anhydride Alpha Olefin Copolymer (C16-C20 Alpha olefin) [40%]
Compound C is an Isooctyl Phosphate Ester [50%]

Discussion of the Examples

The hypothetical Example II shows that the antifoulant additives of the invention were able to synergistically reduce the rate of fouling by about 50% which is greater than any single additive alone. The Example shows that a Maleic Anhydride Alpha Olefin Copolymer and an Alkyl Phosphate Ester can each reduce fouling by over 30 percent alone, and that a combination of a Metal Overbase, a Maleic Anhydride Alpha Olefin Copolymer and an Alkyl Phosphate Ester can combine to synergistically reduce fouling by over 60 percent.

What is claimed is:

1. A process for reducing heat exchanger fouling in an organic chemical production process comprising adding to an organic chemical production process stream an antifoulant additive wherein the antifoulant additive comprises a metallic overbase, an alkylphosphate ester, and an alpha olefin maleic anhydride copolymer wherein the feed range of the antifoulant additives is from about 200 to about 800 ppm.

2. The process of claim 1 wherein the metallic overbase is a magnesium overbase or an aluminum overbase.

3. The process of claim 1 wherein the alkyl phosphate ester is selected from the group consisting of: isododecyl phosphate esters, isooctyl phosphate esters; and mixtures thereof.

4. The process of claim 3 wherein the alkyl phosphate ester is selected from the group consisting of: (ethyl)hexyl thiophosphate ester, di(ethyl)hexyl thiophosphate ester, octyl thiophosphate ester, butyl thiophosphate ester, nonyl thiophosphate ester, t-butyl thiophosphate ester, and mixtures thereof.

5. The process of claim 1 wherein the alpha olefin maleic anhydride copolymer has the general formula:

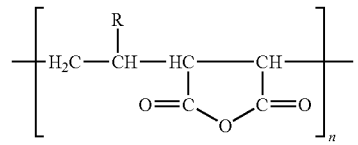

wherein R is a hydrocarbon substituent having from about 6 to about 30 carbons.

6. The process of claim 5 wherein R has from about 10 to 26 carbons.

7. The process of claim 6 the copolymer has a molecular weight (Mw) of from about 2,000 to about 12,000 Daltons.

8. The process of claim 1 wherein the antifoulant additives are used in processes wherein process feed steams are contacted with heat ranging from about 60° C. to about 870° C.

9. The process of claim 8 wherein the organic chemical production process stream is a hydrocarbon or a halohydrocarbon.

10. The process of claim 9 wherein the organic chemical production process produces a compound selected from the group consisting of ethylene dichloride, vinyl chloride monomer, and polyvinyl chloride.

11. The process of claim 10 wherein the organic chemical production process produces vinyl chloride monomer.

* * * * *